US009220084B1

(12) United States Patent
Vyas et al.

(10) Patent No.: US 9,220,084 B1
(45) Date of Patent: Dec. 22, 2015

(54) ACTIVATION OF VOICE OVER INTERNET PROTOCOL APPLICATIONS BASED ON PUSH NOTIFICATIONS

(71) Applicant: Apple Inc., Cupertino, CA (US)

(72) Inventors: Amit K. Vyas, San Jose, CA (US); Albert S. Liu, Cupertino, CA (US); Drew A. Schmitt, Cupertino, CA (US); Justin Wood, Sunnyvale, CA (US); Lee Russell, Sunnyvale, CA (US); Anand Ramadurai, Los Gatos, CA (US); Keith Walter Rauenbuehler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 14/292,678

(22) Filed: May 30, 2014

(51) Int. Cl.
*H04M 1/00* (2006.01)
*H04W 68/00* (2009.01)
*G06F 9/445* (2006.01)
*H04L 29/06* (2006.01)

(52) U.S. Cl.
CPC ............ *H04W 68/005* (2013.01); *G06F 9/445* (2013.01); *H04L 65/105* (2013.01)

(58) Field of Classification Search
CPC .. G06Q 10/10; G06Q 10/107; H04L 12/2602; H04L 29/06027; H04L 43/00; H04L 65/1006; H04L 65/1069; H04L 67/22; H04W 60/04; H04W 8/08
See application file for complete search history.

(56) References Cited

U.S. PATENT DOCUMENTS 8,621,006 B2 * 12/2013 Riddle ........................ 709/204
2008/0081672 A1 * 4/2008 Miyamoto ................... 455/566

* cited by examiner

*Primary Examiner* — Ronald Eisner
(74) *Attorney, Agent, or Firm* — Fish & Richardson P.C.

(57) ABSTRACT

Systems and methods are described for communicating between VoIP applications installed on a mobile computing device and their corresponding servers using a cloud-based notification infrastructure. In one aspect, a method is performed by a notification handler executing on a mobile computing device and includes the actions of maintaining a persistent network connection between the notification handler and a notification server associated with the notification handler; receiving, over the persistent network connection, an incoming call notification for a VoIP application installed on the mobile computing device, the received incoming call notification being relayed by the notification server from a VoIP server to which the VoIP application is associated; determining, in response to the receiving of the incoming call notification, that the VoIP application is in an inactive state; and activating the VoIP application on the mobile computing device to provide information relating to the received incoming call notification.

24 Claims, 4 Drawing Sheets ved first incoming call notification being relayed by the notification server from a first VoIP server to which the first VoIP application is associated; determining, in response to the receiving of the first incoming call notification, that the first VoIP application is in an inactive state; and activating the first VoIP application on the mobile computing device to provide information relating to the received first incoming call notification.

ACTIVATION OF VOICE OVER INTERNET PROTOCOL APPLICATIONS BASED ON PUSH NOTIFICATIONS

TECHNICAL FIELD

The disclosure generally relates to using push notifications for managing Voice over Internet Protocol (VoIP) applications or other applications that implement voice functionality installed on a mobile computing device, e.g., for activating the VoIP applications based on notifications pushed to the mobile computing device by a cloud-based notification infrastructure.

BACKGROUND

VoIP technologies have become ubiquitous for carrying out conversations over data networks, such as over the Internet. A typical VoIP service (e.g., Skype) maintains a persistent network connection between a client-side VoIP application—e.g., installed on a mobile computing device—and a server system associated with the VoIP service. The persistent network connection is maintained over cellular networks and/or WiFi networks. To keep the persistent network connection open and avoid firewall or network address translation (NAT) related timeouts, the foregoing components of the VoIP service repeatedly exchange messages (e.g., keep-alive packets). In this manner, a VoIP service sends keep-alive packets periodically either from its server to the mobile computing device or vice-versa, e.g., every few minutes, to ensure that the connection with the mobile computing device does not timeout. This results in battery drain on the mobile computing device that can represent a large fraction of the total power consumption of the mobile computing device.

SUMMARY

In accordance with the disclosed technologies, a cloud-based notification infrastructure is used for communication between a VoIP application (e.g., Skype) installed on a mobile computing device and its associated server (e.g., Skype server). For instance, Apple push notification service © (APNS) running on the mobile computing device and on a cloud server system can be leveraged to support VoIP applications. In this manner, a VoIP application installed on the mobile computing device registers with a notification service (e.g., APNS) to receive phone calls on the mobile computing device. When a call is destined for the mobile computing device, a server associated with the VoIP application sends a message to the notification service. In turn, a notification server system associated with the notification service pushes an incoming call notification to the mobile computing device. When the notification is received on the mobile computing device, a processor thereof activates the VoIP application and delivers the pushed message packet. At this point, the VoIP application can establish a connection to the VoIP server to carry on the incoming call.

In general, one aspect of the subject matter described in this specification can be implemented in a method performed by a notification handler executing on a mobile computing device. The method includes maintaining a persistent network connection between the notification handler and a notification server associated with the notification handler; monitoring, over the persistent network connection, incoming call notifications for a plurality of voice over internet protocol (VoIP) applications, the incoming call notifications being relayed by the notification server from corresponding VoIP servers, the VoIP applications being installed on the mobile computing device; receiving, over the persistent network connection, a first incoming call notification for a first VoIP application from among the plurality of VoIP applications, the received first incoming call notification being relayed by the notification server from a first VoIP server to which the first VoIP application is associated; determining, in response to the receiving of the first incoming call notification, that the first VoIP application is in an inactive state; and activating the first VoIP application on the mobile computing device to provide information relating to the received first incoming call notification.

The foregoing and other implementations can each optionally include one or more of the following features, alone or in combination. In some implementations, the method can include providing to the activated first VoIP application the information relating to the received first incoming call notification. For instance, the information relating to the received first incoming call notification can include one or more of an identifier of a caller device, a last known location of the caller device, a text message or an audio prompt.

In some implementations, the persistent network connection also can be used to receive from the notification server at least calendar updates for a calendar application operated at the mobile computing device or contact updates for a contacts application operated at the mobile computing device.

In some implementations, maintaining the persistent network connection can be performed in accordance with communication rules associated with a network over which the persistent network connection has been established. In some implementations, the first incoming call notification is first relayed by a session initiation protocol (SIP) proxy server from the first VoIP server to the notification server.

In some implementations, the method can include repeatedly verifying whether the activated first VoIP application is currently being used by a user associated with the mobile computing device. In some cases, the method can further include, in response to determining that the first VoIP application has been unused for at least a predetermined time interval, deactivating the first VoIP application. In other cases, the method can further include, in response to determining that the first VoIP application is currently being unused and a frequency of incoming call notifications for the first VoIP application received from the notification server exceeds a predetermined frequency, deactivating the first VoIP application. In either of these cases, the method can further include notifying the notification server that the first VoIP application is currently inactive at the mobile computing device. In yet some other cases, the method can include, in response to determining that the first VoIP application is currently being used, notifying the notification server that the first VoIP application is currently active at the mobile computing device.

In some implementations, the method can include receiving, over the persistent network connection, a second incoming call notification for a second VoIP application from among the plurality of VoIP applications, the received second incoming call notification being relayed by the notification server from a second VoIP server to which the second VoIP application is associated; determining, in response to the receiving of the second incoming call notification, that the second VoIP application is in an inactive state; and activating the second VoIP application on the mobile computing device to provide information relating to the received second incoming call notification.

In general, another aspect of the subject matter described in this specification can be implemented in a mobile computing device that includes one or more hardware processors; and non-transitory computer readable medium encoding instructions that, when executed by the one or more hardware processors, cause the one or more hardware processors to emulate a notification handler that performs operations including: maintaining a persistent network connection between the notification handler and a notification server associated with the notification handler; monitoring, over the persistent network connection, incoming call notifications for a plurality of voice over internet protocol (VoIP) applications, the incoming call notifications being relayed by the notification server from corresponding VoIP servers, the VoIP applications being installed on the mobile computing device; receiving, over the persistent network connection, a first incoming call notification for a first VoIP application from among the plurality of VoIP applications, the received first incoming call notification being relayed by the notification server from a first VoIP server to which the first VoIP application is associated; determining, in response to receipt of the first incoming call notification, that the first VoIP application is in an inactive state; and activating the first VoIP application on the mobile computing device to provide information relating to the received first incoming call notification.

The foregoing and other implementations can each optionally include one or more of the following features, alone or in combination. In some implementations, the operations further can include providing to the activated first VoIP application the information relating to the received first incoming call notification. For instance, the information relating to the received first incoming call notification can include one or more of an identifier of a caller device, a last known location of the caller device, a text message or an audio prompt.

In some implementations, the persistent network connection also can be used to receive from the notification server at least calendar updates for a calendar application operated at the mobile computing device or contact updates for a contacts application operated at the mobile computing device.

In some implementations, the operation of maintaining the persistent network connection can be performed in accordance with communication rules associated with a network over which the persistent network connection has been established. In some implementations, the first incoming call notification is first relayed by a session initiation protocol (SIP) proxy server from the first VoIP server to the notification server.

In some implementations, the operations further can include repeatedly verifying whether the activated first VoIP application is currently being used by a user associated with the mobile computing device. In some cases, the operations further can include, deactivating the first VoIP application responsive to determination that the first VoIP application has been unused for at least a predetermined time interval. In other cases, the operations can further include deactivating the first VoIP application responsive to determination that (i) the first VoIP application is currently being unused and (ii) a frequency of incoming call notifications for the first VoIP application received from the notification server exceeds a predetermined frequency. In either of these cases, the operations further can include notifying the notification server that the first VoIP application is currently inactive at the mobile computing device. In yet some other cases, the operations further can include notifying the notification server, in response to determining that the first VoIP application is currently being used, that the first VoIP application is currently active at the mobile computing device.

In some implementations, the operations further can include: receiving, over the persistent network connection, a second incoming call notification for a second VoIP application from among the plurality of VoIP applications, the received second incoming call notification being relayed by the notification server from a second VoIP server to which the second VoIP application is associated; determining, in response to the receiving of the second incoming call notification, that the second VoIP application is in an inactive state; and activating the second VoIP application on the mobile computing device to provide information relating to the received second incoming call notification.

Particular implementations of the subject matter described in this specification can be configured so as to realize one or more of the following potential advantages. As an open connection need not be maintained between the client-side VoIP application and the VoIP server, the mobile computing device can preserve computational resources otherwise required to maintain the persistent network connection for the VoIP service. As most mobile computing devices run on battery power, preservation of computational resources results in longer battery life.

Further to prolong battery life of the mobile computing device, the disclosed notification handler process can deactivate the VoIP application if an active VoIP application is unused by a user of the mobile computing device (e.g., runs in the background) for a specified time interval, or if the VoIP application is unused by the user and a rate of push notifications received by the notification handler process for the VoIP application exceeds a predetermined rate.

Furthermore, the notification handler process can indicate to the cloud-based notification server system that the VoIP application installed on the mobile computing device is active (e.g., online and connectable). This information can be provided by the cloud-based notification server system to the VoIP server. This advantage is of interest to online chat services, for instance.

Moreover, as the persistent communication is maintained by the disclosed notification handler process executing at the mobile computing device, the VoIP service (including the client-side VoIP application and the VoIP server) does not need to manage the complexity associated with optimally setting and adapting these communication parameters, e.g., firewall or NAT timeouts, specific to particular cellular networks or WiFi routers, or send keep-alive packets, etc. Instead, the task of managing such communication parameters used to maintain the persistent network connection is performed by a single process, namely the notification handler process, running on the mobile computing device.

In this manner, the above-noted responsibility for communication parameter management is removed from the VoIP application without use of additional computing resources of the mobile computing device since the management of the communication parameters is already being performed by the notification handler process running on the mobile computing device to deliver other notifications (e.g., calendar, contacts, etc.) from other services to the mobile computing device. For instance, the cloud-based notification service (e.g., APNS) can manage the forgoing communication parameters by using a mechanism for growing a time interval between keep-alive packets to determine an optimal NAT timeout, and to only send the NAT timeout as needed.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
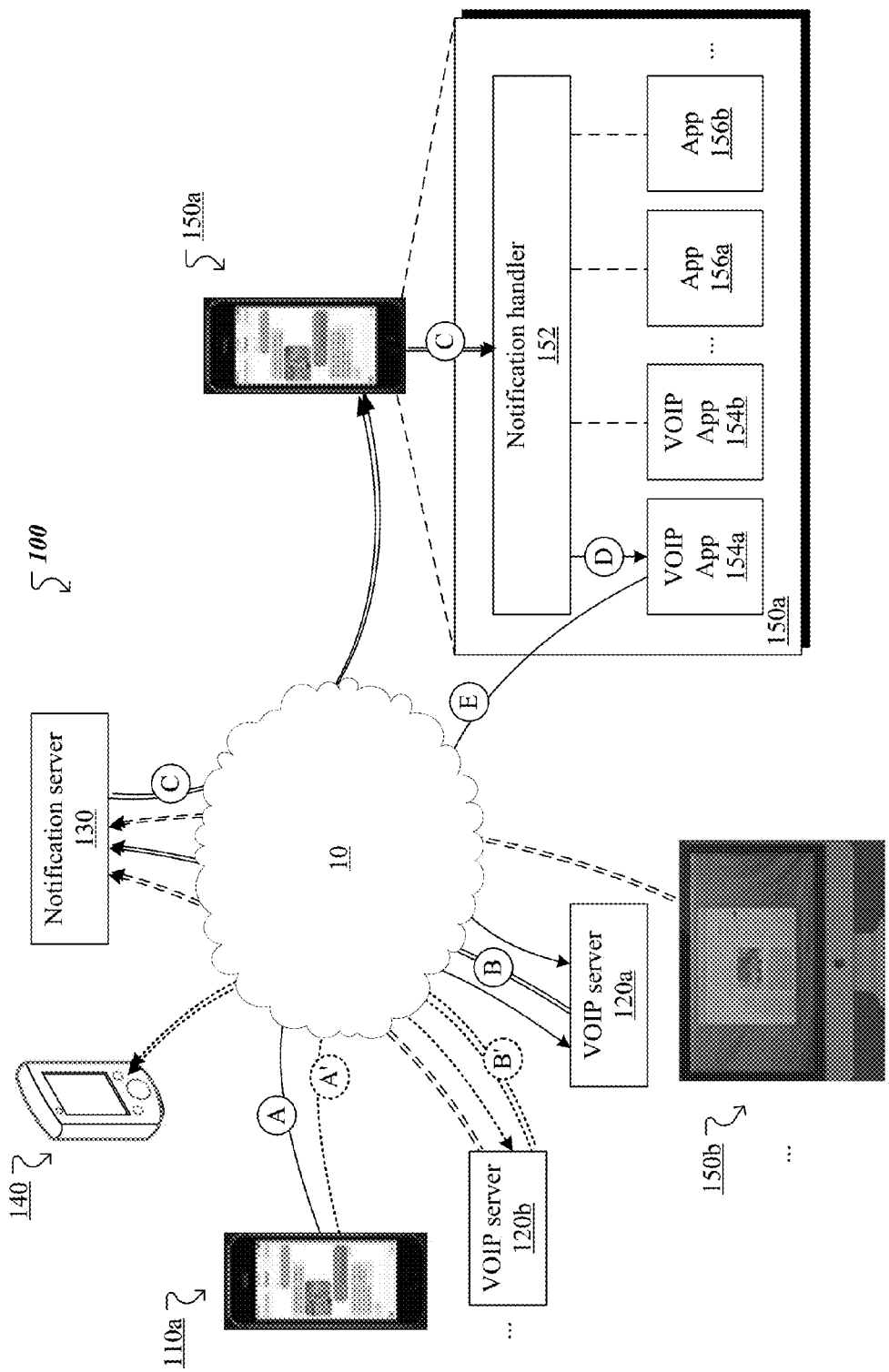
FIG. 1 illustrates an example of a system for managing VoIP services provided to a mobile computing device based on notifications pushed to the mobile computing device.

In accordance with the disclosed technologies, when an application of a VoIP service (referred to as a VoIP application) is installed on a mobile computing device running a cloud-based notification service, the VoIP application communicates with the VoIP service in the following manner. A server of the VoIP service (referred to as a VoIP server) routes incoming calls to the mobile computing device through the cloud-based notification service instead of conventionally routing the incoming calls directly to the VoIP application installed on the mobile computing device.

In this manner, for an outgoing call that originates at the VoIP application running on the mobile computing device and is destined for a recipient device, the VoIP application establishes a network connection directly with the VoIP server configured to facilitate the outgoing call. Then, the VoIP server establishes a communication between the mobile computing device and the recipient device, so the outgoing call between the mobile computing device and the recipient device can be carried out. For an incoming call that originates at a caller device and is destined for the VoIP application installed on the mobile computing device, the caller device establishes a network connection with the VoIP server, which in turn communicates with the cloud-based notification service to which the VoIP service has registered. As such, it will be a server system of the cloud-based notification service that pushes a notification relating to the incoming call (referred to as incoming call notification) to the mobile computing device. The incoming call notification is received at the mobile computing device by a notification handler process associated with the cloud-based notification service. Upon receipt of the incoming call notification, the notification handler process activates (launches, starts, resumes, wakes up, etc.) the VoIP application for which the incoming call notification is destined. The activated VoIP application (e.g., launched, awakened, etc., whether foreground running or background running) now establishes a network connection with the VoIP server. In turn, the latter establishes a communication between the caller device and the mobile computing device, so the incoming call between the caller device and the mobile computing device can be carried out. By operating in this manner, the VoIP service does not have manage NAT timeouts of intervening communication networks, or send keep alive packets, etc. Moreover, there are no additional computing resources consumed by the mobile computing device, since the cloud-based notification service is already running to deliver notifications from other services (e.g., calendar, contacts, etc.) to the mobile computing device.

Any applications (not just VoIP applications) that maintain open connections between the mobile computing device and their respective servers and implement voice functionality can register with the cloud-based notification service, as noted above. Examples of such applications are turn-by-turn navigation, online chat, etc. Note that in accordance with the disclosed technologies, notifications from the cloud-based notification service are not received directly by an application to which the incoming call is destined. Instead they are received by a notification handler process associated with the cloud-based notification service. In turn, the notification handler process activates the recipient application (or gives the recipient application run time.)

System for Activating VoIP Applications Based on Incoming Call Notifications Pushed by Cloud-Based Notification Service FIG. 1 illustrates an example of a system 100 for managing VoIP services provided to a mobile computing device 150a based on notifications pushed to the mobile computing device 150a by a cloud-based notification service.

In this example, the cloud-based notification service includes a local component running on the mobile computing device 150a and another component running remotely from the mobile computing device 150a. Here, the remote component is a notification server 130 running on a server system associated with the cloud-based notification service. The local component is a notification daemon (referred to as a notification handler) 152 running on the mobile computing device 150a. The notification handler 152 is connected as a client to the notification server 130 through a persistent network connection—depicted in FIG. 1 as a double solid-line.

The network 10 over which the notification handler 152 and the notification server 130 communicate with each other can be the Internet, a wide area network (WAN) or a combination thereof. The persistent network connection between the notification handler 152 and the notification server 130 is maintained by the cloud-based notification service over communication channels of one or more of cell networks, WiFi networks, cable networks, etc. Communications between the notification handler 152 and the notification server 130 over such a persistent network connection are carried out through transmission control protocol (TCP), for instance.

Typically, multiple applications 156a, 156b, . . . are installed on the mobile computing device 150a. Examples of such applications are calendar, contacts, image library organizers, etc. The mobile computing device 150a uses the cloud-based notification service to exchange (receive and/or transmit) notifications from corresponding applications running on other client computing devices 150b, . . . associated with the mobile computing device 150a. For instance, a calendar update or contacts update occurs on another computing device 150b associated with the mobile computing device 150a. A notification of such calendar update or contacts update is provided by a component of the cloud-based notification service running locally on the computing device 150b through another persistent network connection (represented as a double dashed-line) to the notification server 130. The notification server 130 pushes the calendar notification or the contacts notification through the persistent network connection to the mobile computing device 150a. Once received by the notification handler 152 running on the mobile computing device 150a, the calendar notification or the contacts notification are triaged and provided to respective recipient applications 156a, 156b, . . . e.g., the calendar application or the contacts application.

Other applications 154a, 154b, . . . installed on the mobile computing device 150a implement voice functionality and are referred to as VoIP applications. Examples of VoIP applications are Skype®, iCall®, Viber®, Talkatone®, chat, etc. Prior to describing the way an incoming call for a VoIP application 154a installed on the mobile computing device 150a is handled in accordance with the disclosed technologies, a conventional way of handling a VoIP call at another mobile computing device 150b is described below.

A caller device 110a transmits over a network connection (represented as a dotted-line) an incoming call packet (A')—that indicates an incoming call for an instance of the VoIP application 154b running on a recipient mobile computing device 150b—to a VoIP server 120b associated with the VoIP application 154b. Communication over the network connection between the caller device 110a and the VoIP server 120b can be carried out through TCP, for instance. Conventionally, the VoIP server 120b and the VoIP application 154b running on the recipient mobile computing device 150b maintain a persistent network connection (represented as a double dotted-line) dedicated to VoIP communications (referred to as a persistent VoIP connection.) Upon receipt of the incoming call packet (A') from the caller device 110a, the VoIP server 120b conventionally provides information (B') about the incoming call through the persistent VoIP connection to the VoIP application 154b running on the recipient mobile computing device 150b. Communication over the persistent VoIP connection between the VoIP server 120b and the VoIP application 154b running on the recipient mobile computing device 150b can be carried out through TCP, for instance. Upon receipt of the information (B') about the incoming call from the VoIP server 120b, the recipient mobile computing device 150b can request that the VoIP server 120b establish the call between the caller device 110a and the recipient mobile computing device 150b.

Power necessary to conventionally maintain such a persistent VoIP connection can shorten the life of a battery of the recipient mobile computing device 150b. Additional computing resources (e.g., processing time and storage space) may be necessary at the VoIP server 120b, at the mobile computing device 150b, or both, to manage the persistent VoIP connection.

The technologies described below reduce the burden on computing resources of the mobile computing device 150a by eliminating the need for computing resources to maintain a persistent VoIP connection between the mobile computing device 150a and a VoIP server 120a, 120b, ... associated with a VoIP application 154a, 154b, ... installed on the mobile computing device 150a. An incoming call for a VoIP application 154a installed on the mobile computing device 150a is handled in accordance with the disclosed technologies as described below.

A caller device 110a transmits over a network connection (represented as a solid line) an incoming call packet (A)—that indicates an incoming call for an instance of the VoIP application 154a installed on the mobile computing device 150a—to a VoIP server 120a associated with the VoIP application 154a. Communication over the network connection between the caller device 110a and the VoIP server 120a can be carried out through TCP, for instance.

In some implementations of the disclosed technologies, the VoIP server 120a and the notification server 130 maintain a persistent network connection (represented as a double solid-line) associated with the cloud-based notification service. As noted above, communication over the persistent network connection maintained by the cloud-based notification service can be carried out through TCP, for instance. Upon receipt of the incoming call packet (A) from the caller device 110a, the VoIP server 120a provides information (B) about the incoming call through the persistent network connection to the notification server 130. Additionally, the notification server 130 can maintain a persistent network connection with another VoIP server 120b (represented as a double dashed-line) and potentially with other VoIP servers (not shown in FIG. 1) respectively corresponding to a VoIP application 154b, and to other VoIP applications installed on the mobile computing device 150a.

In other implementations of the disclosed technologies, the VoIP server 120 maintains a persistent network communication with a session initiation protocol (SIP) proxy server (not shown in FIG. 1.) Here, the VoIP server 120 provides information about the incoming call to the SIP proxy server in a particular format. The SIP proxy server changes the format of the information about the incoming call received from the VoIP server 120 to a format specific to the above-noted cloud-based notification service. Additionally, the SIP proxy server and the notification server 130 maintain a persistent network connection associated with the cloud-based notification service. The information (B) about the incoming call, now converted to the format expected by the notification server 130 is transmitted by the SIP proxy server through the persistent network connection to the notification server 130.

In the example illustrated in FIG. 1, the notification server 130 packages the received information (B) about the incoming call received from the VoIP server 120a into an incoming call notification (C). In some implementations, the incoming call notification (C) can be a TCP packet and includes at least an identifier of the mobile computing device 150a and of the recipient VoIP application 154a.

As noted above, the cloud-based notification service maintains a persistent network connection (represented as a double solid-line) between the notification server 130 and the notification handler 152 running on the mobile computing device 150a. As such, the notification server 130 transmits the incoming call notification (C) through the persistent network connection maintained by the cloud-based notification service to the notification handler 152 running on the mobile computing device 150a. Upon receipt of the incoming call notification (C) from the notification server 130, notification handler 152 determines which of the multiple VoIP applications 154a, 154b, ... installed on the mobile computing device 150a is the recipient of the incoming call notification (C). Such a determination is performed by the notification handler 152 based on an identifier of one of the VoIP applications 154a, 154b, ... included in the received incoming call notification (C).

Once the notification handler 152 identifies VoIP application 154a as the recipient of the incoming call notification (C), the notification handler 152 verifies whether the recipient VoIP application 154a is active (e.g., foreground running or background running) If so, the notification handler 152 provides the active VoIP application 154a an indication (D) of an incoming call. Else, if a result of the verification is that the VoIP application 154a is inactive (e.g., terminated or background suspended) the notification handler 152 causes the inactive VoIP application 154a to become active. In some implementations, the notification handler 152 sends a wake-up message directly to the inactive VoIP application 154a to activate it. In other implementations, the notification handler 152 requests that an application manager process (not shown in FIG. 1) activate the inactive VoIP application 154a. Upon activation of the VoIP application 154a, the notification handler 152 provides the VoIP application 154a the indication (D) of the incoming call.

At this point, the VoIP application 154a running on the mobile computing device 150a can transmit—over a direct network connection (represented as a solid-line) between the VoIP application 154a and the VoIP server 120a—a request (E) that the VoIP server 120a establish the call between the caller device 110a and the VoIP application 154a running on the recipient mobile computing device 150a.

In the case described above, the incoming call notification (C) received by the notification handler 152 from the notification server 130 notifies the VoIP application 154a of an incoming call. Here, a payload of a data packet of the incoming call notification (C) includes an instruction that the VoIP application 154a connect with the VoIP server 120a. However, as a size of the data packet's payload is 256 bytes or 4 Kbytes, additional information can be included in the incoming call notification (C), depending on the type of incoming call, for instance. In some cases, the incoming call is simply a message originated at the caller device 110a. In such case, a portion of or the entire message may be included in the payload of the incoming call notification (C)' packet transmitted by the notification server 130. Here, the message is relayed by the notification handler 152 to the VoIP application 154a as part of the indication (D) when the VoIP application is being awaken, for instance. Other tasks can be communicated as part of the payload of the incoming call notification (C) to be passed along to the VoIP application 154a as the indication (D). For example, an identifier associated with the caller computing device 110b, text messages, location of caller device 110b at last check in, information about a user associated with the caller computing device 110b, an audio prompt, e.g., "hey, why don't you answer your call?", etc.

Figure 2:
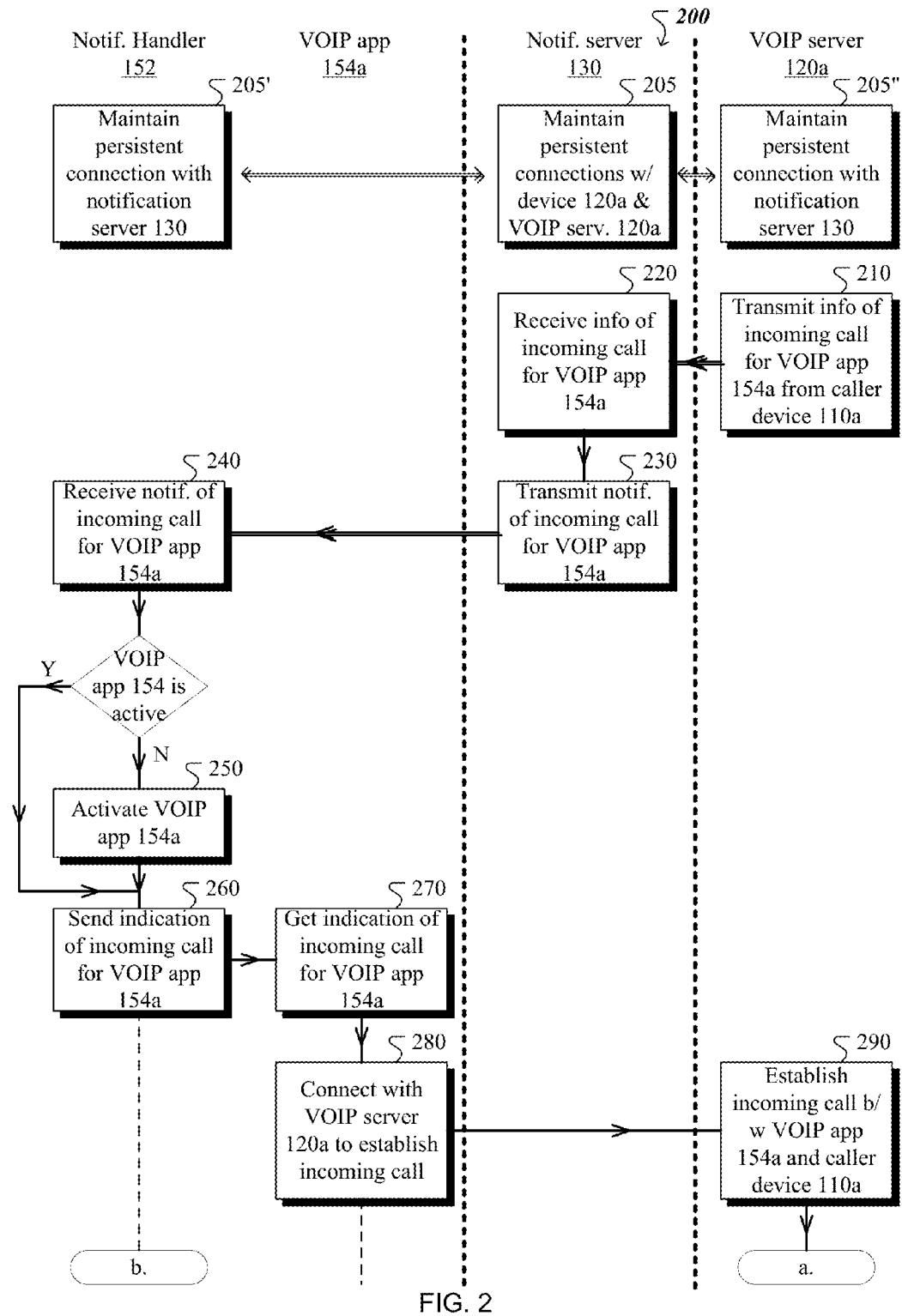
FIG. 2 is a flow chart of an example of a process for managing a VoIP service provided to a mobile computing device based on notifications pushed to the mobile computing device.

Activating VoIP Applications Installed on Mobile Computing Device Based on Incoming Call Notifications Pushed by Cloud-Based Notification Service FIG. 2 is a flow chart of an example of a process 200 for managing a VoIP service provided to a mobile computing device based on notifications pushed to the mobile computing device by a cloud-based notification service. The process 200 can be implemented in the system 100 described above in connection with FIG. 1. For instance, some of the operations of the process 200 can be performed at the mobile computing device 150a by the notification handler process 152 and by the recipient VoIP application 154a. Some other of the operations of the process 200 can be performed at the notification server 130, and yet some other operations of the process 200 can be performed at the VoIP server 120a associated with the recipient VoIP application 154a.

At 205, the notification server 130 maintains persistent network connections with at least (i) the mobile computing device 150a on which the recipient VoIP application 154a is installed and (ii) the VoIP server 120a associated with the recipient VoIP application 154a.

Some operations of the maintaining of the persistent network connection between the notification server 130 and the mobile computing device 150a are performed, at 205', by the notification handler 152 running on the mobile computing device 150a. In general, this persistent network connection is used by the notification server 130 to transmit to the notification handler 152 running on the mobile computing device 150a (I) notifications about multiple incoming calls respectively destined for VoIP applications 154a, 154b, . . . installed on the mobile computing device 150a, and (II) update notifications destined for other applications 156a, 156b, . . . (e.g., calendar, contacts, image library organizers, etc.) installed on the mobile computing device 150a.

Additionally, some operations of the maintaining of the persistent network connection between the notification server 130 and the VoIP server 120a are performed, at 205", by the VoIP server 120a. In general, this persistent network connection is used by the VoIP server 120a to transmit to the notification server 130 information about multiple incoming calls destined for instances of the VoIP application 154a installed on respective other computing devices.

At 210, the VoIP server 120a transmits, over the persistent network connection associated with the cloud-based notification service to the notification server 130, information about an incoming call for the VoIP application 154a installed on the mobile computing device 150a. A message about this incoming call was received by the VoIP server 120 from a caller device 110a.

At 220, the notification server 130 receives, over the persistent network connection associated with the cloud-based notification service from the VoIP server 120a, the information about the incoming call for the VoIP application 154a installed on the mobile computing device 150a. Here, the notification server 130 packages the received incoming call information into a notification of the incoming call for the VoIP application 154a installed on the mobile computing device 150a.

At 230, the notification server 130 transmits, over the persistent network connection associated with the cloud-based notification service to the notification handler 152 running on the mobile computing device 150a, the notification of the incoming call for the VoIP application 154a installed on the mobile computing device 150a.

At 240, the notification handler 152 receives, over the persistent network connection associated with the cloud-based notification service from the notification server 130, the notification of the incoming call for the VoIP application 154a installed on the mobile computing device 150a.

Here, the notification handler 152 verifies whether the VoIP application 154a is active on the mobile computing device 150a.

If a result of verification is that the VoIP application 154a is inactive (e.g., terminated or background suspended), then, at 250, the notification handler 152 causes activation of the VoIP application 154a. This can be performed by the notification handler 152 by sending the VoIP application 154a a "wake-up" instruction, or by requesting that an application manager instruct the VoIP application 154a to wake-up. Once the VoIP application 154a has been activated, the notification handler 152 continues to the next operation of the process 200. Else, if the result of the verification is that the VoIP application 154a is active (e.g., foreground running or background running), then the notification handler 152 continues to the next operation of the process 200.

At 260, the notification handler 152 provides the active VoIP application 154a an indication of the incoming call.

At 270, the active VoIP application 154a obtains from the notification handler 152 the indication of the incoming call.

At 280, in response to obtaining the indication of the incoming call from the notification handler 152, the active VoIP application 154a connects directly with the VoIP server 120a to establish the incoming call.

At 290, in response to being connected directly by the recipient VoIP application running on the mobile computing device 150a, the VoIP server 120a establishes the incoming call between the caller computing device 110a and the recipient VoIP application running on the mobile computing device 150a.

Managing a VoIP Service Provided on a Mobile Computing Device

Figure 3:
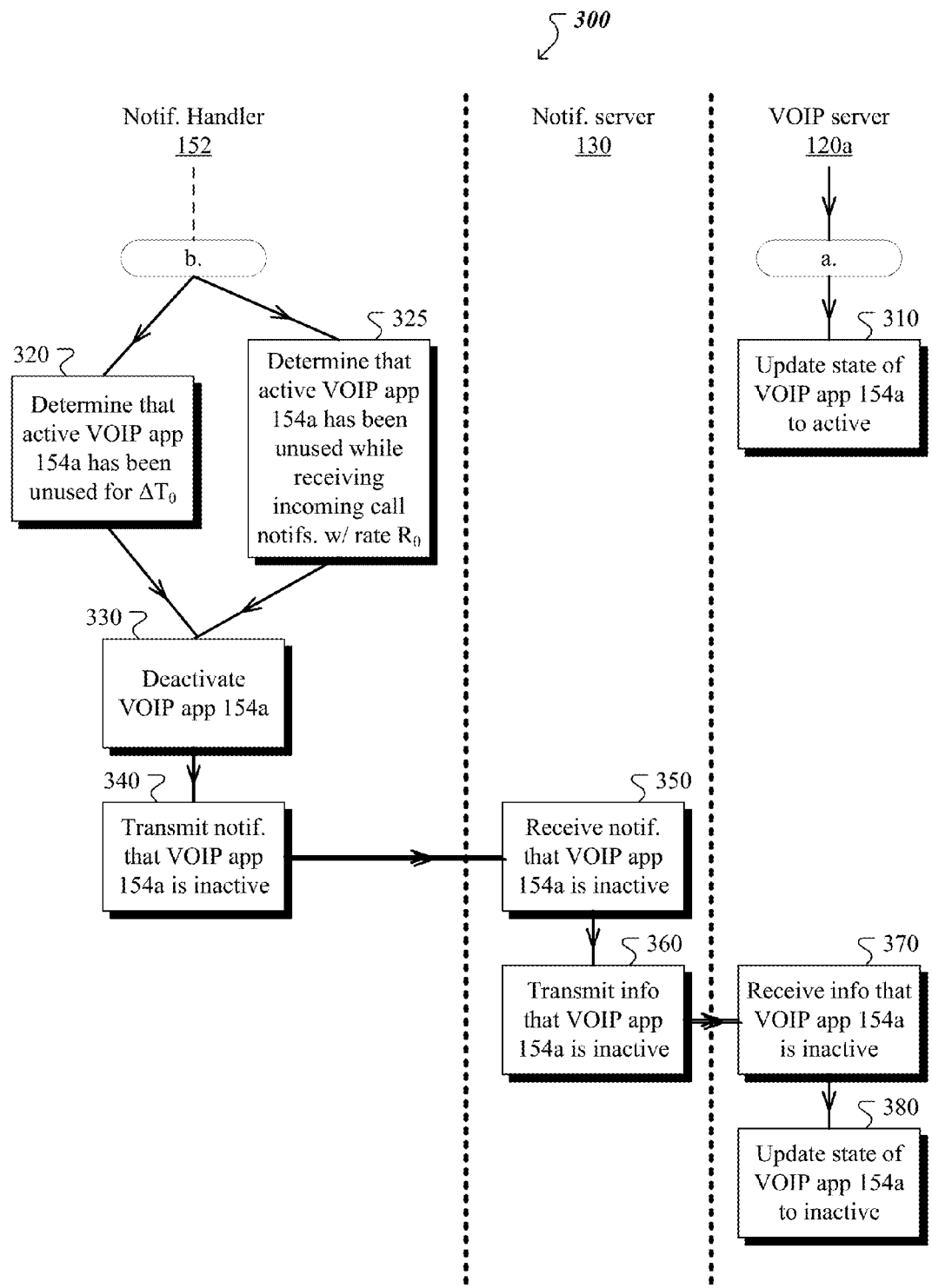
FIG. 3 is a flow chart of an example of another process for further managing a VoIP service provided to a mobile computing device.

FIG. 3 is a flow chart of an example of another process 300 for managing a VoIP service provided to a mobile computing device. The process 300 can be implemented in the system 100 described above in connection with FIG. 1. For instance, some of the operations of the process 300 can be performed at the mobile computing device 150a by the notification handler process 152. Some other of the operations of the process 300 can be performed at the notification server 130, and yet some other operations of the process 200 can be performed at the VoIP server 120a associated with the VoIP application 154a. Moreover, the process 300 can be implemented in conjunction with the process 200 described above in connection with FIG. 2.

At 310, in response to the establishing (at 290) of the incoming call between the caller computing device 110a and the recipient VoIP application 154a running on the mobile computing device 150a, the VoIP server 120a can update a state of the VoIP application 154a installed on the mobile computing device 150a to an active state. Keeping track by the VoIP server 120a of whether instances of the VoIP application 154a are active or inactive at respective computing devices 150a, 150b, ... can be useful if the VoIP application 154a is a chat application, for instance.

At 320, after a time interval $\Delta T$ since the notification handler 152 running on the mobile computing device 150a has provided (at 260) to the active VoIP application 154a the indication of the incoming call, the notification handler 152 can determine that (i) the active VoIP application 154a has not been used during the time interval $\Delta T$, and (ii) that $\Delta T$ exceeds a predetermined time interval $\Delta T > \Delta T_0$, where $\Delta T_0 = 30$, 60 or 180 sec, for instance.

Alternatively or additionally, at 325, the notification handler 152 running on the mobile computing device 150a can determine that (I) the active VoIP application 154a has not been used although additional incoming call notifications have been provided to the active VoIP application 154a at a rate R (e.g., notifications/min) since the notification handler 152 had provided (at 260) to the active VoIP application 154a the indication of the incoming call; and (II) that the rate R of incoming call notifications exceeds a predetermined rate $R > R_0$, where $R_0 = 1$, 2 or 6 notifications/min.

Either of the determinations at 320 or 325 indicate that, although active, the VoIP application 154a is currently being unused by a user of the mobile computing device 150a. To conserve computing resources and battery life, at 330, the notification handler 152 causes deactivation of the active but currently unused VoIP application 154a. This can be performed by the notification handler 152 by sending the VoIP application 154a a "close" instruction, or by requesting that an application manager instruct the VoIP application 154a to close.

At 340, in response to the deactivating of the VoIP application 154a, the notification handler 152 transmits, over the persistent network connection associated with the cloud-based notification service to the notification server 130, a notification that the VoIP application 154a is inactive at the mobile computing device 150a.

At 350, the notification server 130 receives, over the persistent network connection associated with the cloud-based notification service from the notification handler 152 running on the mobile computing device 150a, the notification that the VoIP application 154a is inactive at the mobile computing device 150a. Here, the notification server 130 extracts—from the received notification—information that the VoIP application 154a is inactive at the mobile computing device 150a.

At 360, the notification server 130 transmits, over the persistent network connection associated with the cloud-based notification service to the VoIP server 120a, the information that the VoIP application 154a is inactive at the mobile computing device 150a.

At 370, the VoIP server 120a receives, over the persistent network connection associated with the cloud-based notification service from the notification server 130, the information that the VoIP application 154a is inactive at the mobile computing device 150a.

At 380, in response to receiving from the notification server 130 the information that the VoIP application 154a is inactive at the mobile computing device 150a, the VoIP server 120a can update a state of the VoIP application 154a installed on the mobile computing device 150a to an inactive state. As noted above, keeping track by the VoIP server 120a of whether instances of the VoIP application 154a are active or inactive at respective computing devices 150a, 150b, ... can be useful if the VoIP application 154a is a chat application, for instance.

Example of a System Architecture

Figure 4:
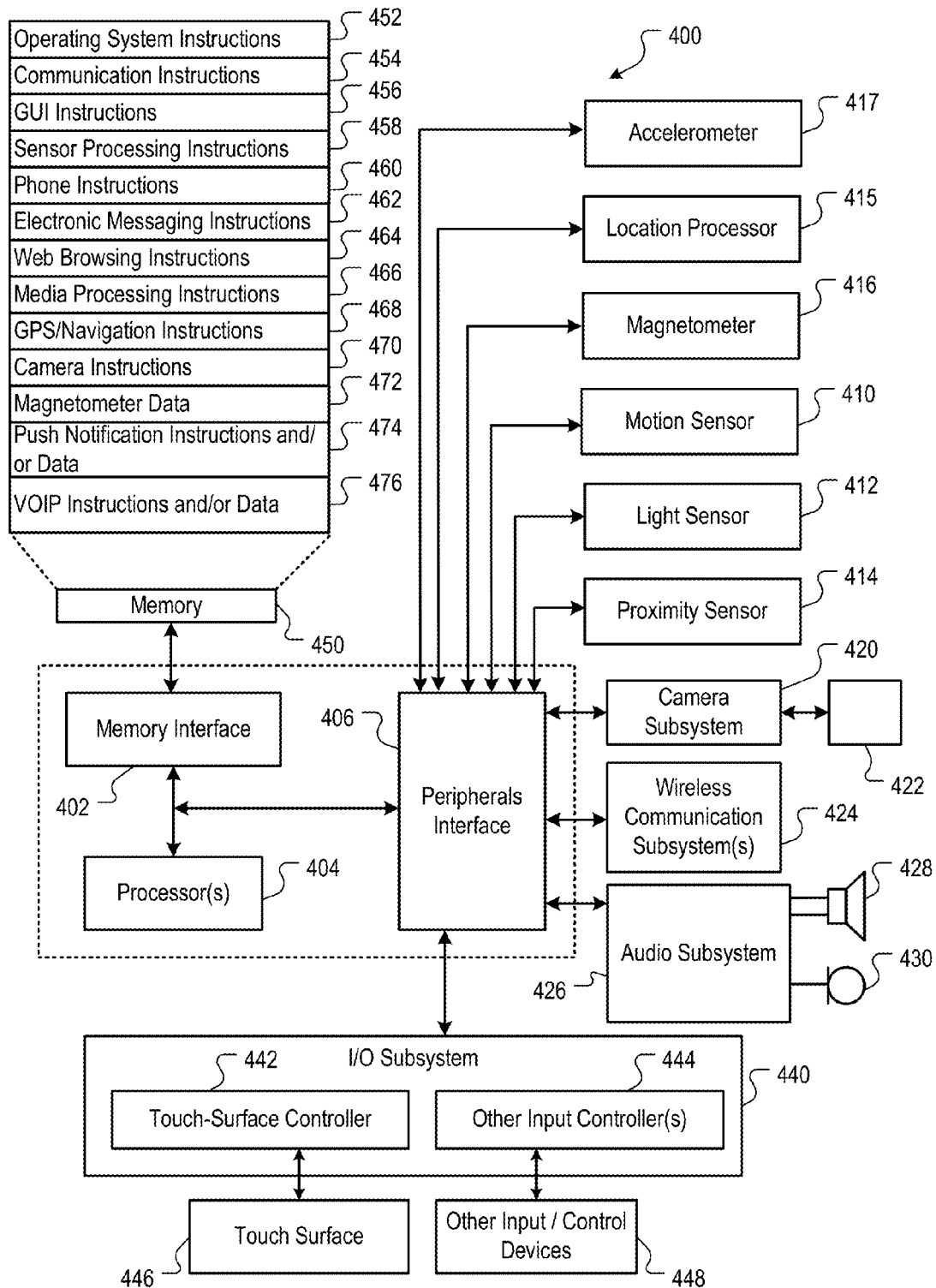
FIG. 4 is a block diagram of an example of a computing device that can implement the technologies described in connection with FIGS. 1-3.

FIG. 4 is a block diagram of an example computing device 400 that can implement the features and processes of FIGS. 1-3. The computing device 400 can include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the computing device 400 can be coupled by one or more communication buses or signal lines.

Sensors, devices, and subsystems can be coupled to the peripherals interface 406 to facilitate multiple functionalities. For example, a motion sensor 410, a light sensor 412, and a proximity sensor 414 can be coupled to the peripherals interface 406 to facilitate orientation, lighting, and proximity functions. Other sensors 416 can also be connected to the peripherals interface 406, such as a global navigation satellite system (GNSS) (e.g., GPS receiver), a temperature sensor, a biometric sensor, magnetometer or other sensing device, to facilitate related functionalities.

A camera subsystem 420 and an optical sensor 422, e.g., a charged coupled device (CCD) or a complementary metal-oxide semiconductor (CMOS) optical sensor, can be utilized to facilitate camera functions, such as recording photographs and video clips. The camera subsystem 420 and the optical sensor 422 can be used to collect images of a user to be used during authentication of a user, e.g., by performing facial recognition analysis.

Communication functions can be facilitated through one or more wireless communication subsystems 424, which can include radio frequency receivers and transmitters and/or optical (e.g., infrared) receivers and transmitters. The specific design and implementation of the communication subsystem 424 can depend on the communication network(s) over which the computing device 400 is intended to operate. For example, the computing device 400 can include communication subsystems 424 designed to operate over a GSM network, a GPRS network, an EDGE network, a Wi-Fi or WiMax network, and a Bluetooth™ network. In particular, the wireless communication subsystems 424 can include hosting protocols such that the device 100 can be configured as a base station for other wireless devices.

An audio subsystem 426 can be coupled to a speaker 428 and a microphone 430 to facilitate voice-enabled functions, such as speaker recognition, voice replication, digital recording, and telephony functions. The audio subsystem 426 can be configured to facilitate processing voice commands, voice printing and voice authentication, for example.

The I/O subsystem 440 can include a touch-surface controller 442 and/or other input controller(s) 444. The touch-surface controller 442 can be coupled to a touch surface 446. The touch surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 can be coupled to other input/control devices 448, such as one or more buttons, rocker switches, thumb-wheel, infrared port, USB port, and/or a pointer device such as a stylus. The one or more buttons (not shown) can include an up/down button for volume control of the speaker 428 and/or the microphone 430.

In one implementation, a pressing of the button for a first duration can disengage a lock of the touch surface 446; and a pressing of the button for a second duration that is longer than the first duration can turn power to the computing device 400 on or off. Pressing the button for a third duration can activate a voice control, or voice command, module that enables the user to speak commands into the microphone 430 to cause the device to execute the spoken command. The user can customize a functionality of one or more of the buttons. The touch surface 446 can, for example, also be used to implement virtual or soft buttons and/or a keyboard.

In some implementations, the computing device 400 can present recorded audio and/or video files, such as MP3, AAC, and MPEG files. In some implementations, the computing device 400 can include the functionality of an MP3 player, such as an iPod™.

The memory interface 402 can be coupled to memory 450. The memory 450 can include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks.

The operating system 452 can include instructions for handling basic system services and for performing hardware dependent tasks. In some implementations, the operating system 452 can be a kernel (e.g., UNIX kernel). In some implementations, the operating system 452 can include instructions for performing dynamic adjustment of the mobile computing device based on user activity. For example, operating system 452 can implement aspects of the system 100 described above in connection with FIG. 1, and/or aspects of the processes 200 and/or 300 described above in connection with FIGS. 2 and 3.

The memory 450 can also store communication instructions 454 to facilitate communicating with one or more additional devices, one or more computers and/or one or more servers. The memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions.

The memory 450 can also store other software instructions 470, such as web video instructions to facilitate web video-related processes and functions; and/or web shopping instructions to facilitate web shopping-related processes and functions. In some implementations, the media processing instructions 466 are divided into audio processing instructions and video processing instructions to facilitate audio processing-related processes and functions and video processing-related processes and functions, respectively.

The memory 450 can store software instructions 474 to facilitate processes and functions for push notifications, or other software instructions 476 to facilitate processes and functions for VoIP service management, as described with reference to FIGS. 1-3.

Each of the above identified instructions and applications can correspond to a set of instructions for performing one or more functions described above. These instructions need not be implemented as separate software programs, procedures, or modules. The memory 450 can include additional instructions or fewer instructions. Furthermore, various functions of the computing device 400 can be implemented in hardware and/or in software, including in one or more signal processing and/or application specific integrated circuits.

Implementations of the subject matter and the functional operations described in this specification can be configured in digital electronic circuitry, in tangibly-embodied computer software or firmware, in computer hardware, including the structures disclosed in this specification and their structural equivalents, or in combinations of one or more of them. Implementations of the subject matter described in this specification can be configured as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be configured on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be configured in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a notification handler executing on a mobile computing device, the method comprising:
    maintaining a persistent network connection between the notification handler and a notification server associated with the notification handler;
    monitoring, over the persistent network connection, incoming call notifications for a plurality of voice over internet protocol (VoIP) applications, the incoming call notifications being relayed by the notification server from corresponding VoIP servers, the VoIP applications being installed on the mobile computing device;

receiving, over the persistent network connection, a first incoming call notification for a first VoIP application from among the plurality of VoIP applications, the received first incoming call notification being relayed by the notification server from a first VoIP server to which the first VoIP application is associated;

determining, in response to the receiving of the first incoming call notification, that the first VoIP application is in an inactive state; and activating the first VoIP application on the mobile computing device to provide information relating to the received first incoming call notification.

2. The method of claim 1, further comprising providing to the activated first VoIP application the information relating to the received first incoming call notification.

3. The method of claim 2, wherein the information relating to the received first incoming call notification comprises one or more of an identifier of a caller device, a last known location of the caller device, a text message or an audio prompt.

4. The method of claim 1, wherein the persistent network connection also is used to receive from the notification server at least calendar updates for a calendar application operated at the mobile computing device or contact updates for a contacts application operated at the mobile computing device.

5. The method of claim 1, wherein the maintaining of the persistent network connection is performed in accordance with communication rules associated with a network over which the persistent network connection has been established.

6. The method of claim 1, wherein the first incoming call notification is first relayed by a session initiation protocol (SIP) proxy server from the first VoIP server to the notification server.

7. The method of claim 1, further comprising repeatedly verifying whether the activated first VoIP application is currently being used by a user associated with the mobile computing device.

8. The method of claim 7, further comprising, in response to determining that the first VoIP application has been unused for at least a predetermined time interval, deactivating the first VoIP application.

9. The method of claim 7, further comprising, in response to determining that the first VoIP application is currently being unused and a frequency of incoming call notifications for the first VoIP application received from the notification server exceeds a predetermined frequency, deactivating the first VoIP application.

10. The method of claim 8 or 9, further comprising notifying the notification server that the first VoIP application is currently inactive at the mobile computing device.

11. The method of claim 7, further comprising, in response to determining that the first VoIP application is currently being used, notifying the notification server that the first VoIP application is currently active at the mobile computing device.

12. The method of claim 1, further comprising receiving, over the persistent network connection, a second incoming call notification for a second VoIP application from among the plurality of VoIP applications, the received second incoming call notification being relayed by the notification server from a second VoIP server to which the second VoIP application is associated;

determining, in response to the receiving of the second incoming call notification, that the second VoIP application is in an inactive state; and activating the second VoIP application on the mobile computing device to provide information relating to the received second incoming call notification.

13. A mobile computing device comprising:

one or more hardware processors; and non-transitory computer readable medium encoding instructions that, when executed by the one or more hardware processors, cause the one or more hardware processors to emulate a notification handler that performs operations comprising:

maintaining a persistent network connection between the notification handler and a notification server associated with the notification handler;

monitoring, over the persistent network connection, incoming call notifications for a plurality of voice over internet protocol (VoIP) applications, the incoming call notifications being relayed by the notification server from corresponding VoIP servers, the VoIP applications being installed on the mobile computing device;

receiving, over the persistent network connection, a first incoming call notification for a first VoIP application from among the plurality of VoIP applications, the received first incoming call notification being relayed by the notification server from a first VoIP server to which the first VoIP application is associated;

determining, in response to receipt of the first incoming call notification, that the first VoIP application is in an inactive state; and activating the first VoIP application on the mobile computing device to provide information relating to the received first incoming call notification.

14. The mobile computing device of claim 13, wherein the operations further comprise providing to the activated first VoIP application the information relating to the received first incoming call notification.

15. The mobile computing device of claim 14, wherein the information relating to the received first incoming call notification comprises one or more of an identifier of a caller device, a last known location of the caller device, a text message or an audio prompt.

16. The mobile computing device of claim 13, wherein the persistent network connection also is used to receive from the notification server at least calendar updates for a calendar application operated at the mobile computing device or contact updates for a contacts application operated at the mobile computing device.

17. The mobile computing device of claim 13, wherein the operation of maintaining the persistent network connection is performed in accordance with communication rules associated with a network over which the persistent network connection has been established.

18. The mobile computing device of claim 13, wherein the first incoming call notification is first relayed by a session initiation protocol (SIP) proxy server from the first VoIP server to the notification server.

19. The mobile computing device of claim 13, wherein the operations further comprise repeatedly verifying whether the activated first VoIP application is currently being used by a user associated with the mobile computing device.

20. The mobile computing device of claim 19, wherein the operations further comprise, deactivating the first VoIP application responsive to determination that the first VoIP application has been unused for at least a predetermined time interval.

21. The mobile computing device of claim 19, wherein the operations further comprise deactivating the first VoIP application responsive to determination that (i) the first VoIP application is currently being unused and (ii) a frequency of incoming call notifications for the first VoIP application received from the notification server exceeds a predetermined frequency.

22. The mobile computing device of claim 20 or 21, wherein the operations further comprise notifying the notification server that the first VoIP application is currently inactive at the mobile computing device.

23. The mobile computing device of claim 19, wherein the operations further comprise notifying, the notification server in response to determining that the first VoIP application is currently being used, that the first VoIP application is currently active at the mobile computing device.

24. The mobile computing device of claim 13, wherein the operations further comprise:
- receiving, over the persistent network connection, a second incoming call notification for a second VoIP application from among the plurality of VoIP applications, the received second incoming call notification being relayed by the notification server from a second VoIP server to which the second VoIP application is associated;
- determining, in response to the receiving of the second incoming call notification, that the second VoIP application is in an inactive state; and
- activating the second VoIP application on the mobile computing device to provide information relating to the received second incoming call notification.

* * * * *